United States Patent
McDavid, Jr.

(10) Patent No.: US 6,518,680 B2
(45) Date of Patent: Feb. 11, 2003

(54) FLUID-POWERED ENERGY CONVERSION DEVICE

(76) Inventor: William K. McDavid, Jr., P.O. Box 319, Wilson, WY (US) 83014

( * ) Notice: Subject to any disclaimer, the term of this patent is extended or adjusted under 35 U.S.C. 154(b) by 0 days.

(21) Appl. No.: 09/872,690

(22) Filed: May 31, 2001

(65) Prior Publication Data

US 2002/0180216 A1 Dec. 5, 2002

Related U.S. Application Data

(60) Provisional application No. 60/249,493, filed on Nov. 17, 2000.

(51) Int. Cl.[7] ............................................. F03B 13/00
(52) U.S. Cl. ............................ 290/54; 290/55; 415/4.2
(58) Field of Search ............................ 290/54, 44, 55; 415/2.1, 4.2, 208.2

(56) References Cited

U.S. PATENT DOCUMENTS

| | | | | |
|---|---|---|---|---|
| 2,468,964 A | | 5/1949 | Dunn et al. | 74/720 |
| 3,248,967 A | | 5/1966 | Lewis | 74/572 |
| 3,942,909 A | * | 3/1976 | Yengst | 416/119 |
| 3,970,409 A | * | 7/1976 | Luchuk | 415/4.3 |
| 4,018,543 A | | 4/1977 | Carson et al. | 415/2 |
| 4,070,131 A | | 1/1978 | Yen | 415/3 |
| 4,191,505 A | * | 3/1980 | Kaufman | 415/101 |
| 4,295,386 A | * | 10/1981 | Zhivotov | 451/343 |
| 4,309,146 A | | 1/1982 | Hein et al. | 415/2 R |
| 4,335,627 A | | 6/1982 | Maxwell | 74/572 |
| 4,418,880 A | * | 12/1983 | de Waal | 239/127.3 |
| 4,421,452 A | | 12/1983 | Rougemont | 415/4 |
| 4,452,562 A | | 6/1984 | Hsu | 415/2 A |
| 4,457,666 A | * | 7/1984 | Selman, Jr. | 415/1 |
| 4,499,034 A | * | 2/1985 | McAllister, Jr. | 261/109 |
| 4,508,973 A | | 4/1985 | Payne | 290/5 S |
| 4,834,610 A | * | 5/1989 | Bond, III | 415/141 |
| 4,963,761 A | * | 10/1990 | Wight | 290/55 |
| 5,086,664 A | | 2/1992 | Wagner | 74/572 |
| 5,197,352 A | | 3/1993 | Haikawa | 74/574 |
| 5,300,817 A | * | 4/1994 | Baird | 290/1 R |
| 5,463,257 A | | 10/1995 | Yea | 290/55 |
| 5,478,197 A | | 12/1995 | Schatz et al. | 415/2.1 |
| 5,503,464 A | * | 4/1996 | Collura | 301/5.22 |
| 5,852,331 A | | 12/1998 | Giorgini | 290/55 |
| 5,935,007 A | | 8/1999 | Yang | 464/24 |

FOREIGN PATENT DOCUMENTS

| | | |
|---|---|---|
| EP | 0294049 A2 | 5/1988 |
| WO | WO93/19294 | 9/1993 |

* cited by examiner

*Primary Examiner*—Joseph Waks
(74) *Attorney, Agent, or Firm*—Steven W. Smith

(57) ABSTRACT

A fluid-powered energy conversion device for converting energy in a moving fluid such as air into mechanical energy. A rigid cylindrical frame includes an upstream annular chamber and a downstream annular chamber, each of the chambers having sides that are open to allow entry of the wind. A plurality of longitudinal baffles form a toroidal pattern that creates an upstream drive vortex in the upstream chamber, and a downstream extraction vortex rotating in the opposite direction in the downstream chamber. The drive vortex rises and changes direction as it passes through a turbine mounted on a longitudinal drive shaft in a central aperture between the chambers. The turbine is rotated by the rotational momentum of the drive vortex, by lift that is generated by each turbine blade, and by additional momentum that is created by the vortex reversal.

20 Claims, 5 Drawing Sheets

FLUID-POWERED ENERGY CONVERSION DEVICE

This application claims the benefit of Provisional Application No. 60/249,493 filed Nov. 17, 2000.

BACKGROUND OF THE INVENTION

1. Technical Field of the Invention

The present invention relates generally to electrical generation and energy conversion devices, and more particularly to a fluid-powered energy conversion device that converts the energy of wind or flowing water to mechanical or electrical energy.

2. Description of Related Art

The use of wind or flowing water to provide power for various uses dates back many centuries. In modern times, wind and water have been used to generate electricity. Hydro-electric generating plants have been used to generate large quantities of electrical energy for widespread distribution. However, this requires major permanent environmental changes to the areas where dams are built and reservoirs rise. Wind-powered devices, in general, have been used to perform mechanical work, or to generate electricity, only on a limited scale. With the ever increasing demand for additional or alternative energy sources, all possible sources are being given more scrutiny. This is particularly true for sources that are non-polluting and inexhaustible. Free-flowing hydro-electric and wind-powered systems provide such sources, and the capturing of increased energy from wind and water has received much consideration.

Commercial hydro-electric and wind-powered electrical generation devices that are currently in use, however, have several disadvantages. Wind-powered devices, in particular, are expensive, inefficient, dangerous, noisy, and unpleasant to be around. To capture a large volume of wind, existing wind-powered devices are very large. As a result, they cannot be distributed throughout population centers, but must be installed some distance away. Then, like dams with hydro-electric generators, the electrical energy they generate must be transmitted, at considerable cost and with considerable lost energy, to the population centers where the energy is needed.

It would be desirable to distribute smaller water-powered and wind-powered units throughout the population centers. For example, it would be desirable to have a wind-powered unit for each building structure, thus distributing the generating capacity over the entire area, and making the energy supply less vulnerable to local events such as storms or earthquakes. Such distributed generation would also solve the most common and valid objection to wind power, that is, that the wind does not always blow. In a large geographical area, however, wind is almost always blowing somewhere. Therefore, with wind-powered generators distributed throughout the area, power could be generated in the areas where the wind is blowing, and then transmitted to the rest of the power grid. However, with existing technology, smaller units suitable for distributing throughout a population area are not efficient enough to provide a sufficient amount of energy to power a structure such as a house or office building. In addition, such units are visually obtrusive and noisy, making them unsuitable for use in residential or other highly populated settings.

Existing wind-powered electrical generation devices commonly utilize a propeller mounted on the horizontal shaft of a generator which, in turn, is mounted at the top of a tower. This is an inefficient design because energy is extracted from the wind by reducing the wind velocity as it passes through the propeller. This creates a pocket of slow-moving air centered behind the propeller, which the ambient wind blows around. Therefore, only the outer portion of the propeller blades use the wind efficiently.

To counter this effect, modern windmill designs utilize extremely long propeller blades. The use of such massive blades, however, has its own disadvantages. First, the propellers are known to kill or injure thousands of large birds each year. Second, the massive blades can be dangerous if the device fails structurally and the propeller breaks loose. In this case, the propeller can fly a considerable distance and cause serious damage or injury to anything or anyone in its path. Third, the propeller design contains an inherent gravitational imbalance. The rising blades on one side of the propeller's hub are opposing gravity, while the descending blades on the other side of the hub are falling with gravity. This imbalance creates a great deal of vibration and stress on the device. At great expense, consequently, the device must be structurally enhanced to withstand the vibration and stress, and thus avoid frequent maintenance and/or replacement.

It would therefore be advantageous to have a fluid-powered energy conversion device that overcomes the shortcomings of existing devices. Such a device could utilize wind energy or the energy of flowing water to provide mechanical energy or electrical energy. The present invention provides such a device.

SUMMARY OF THE INVENTION

In one aspect, the present invention is a fluid-powered energy conversion device for converting wind energy into mechanical or electrical energy. The device includes a rigid cylindrical frame having an upstream annular chamber, an intervening turbine, and a downstream annular chamber, each of the chambers having sides that are open to allow entry of the ambient wind. A first plurality of baffles is longitudinally mounted in the upstream chamber, and operate to create in the upstream chamber, an upstream drive vortex rotating in a first direction when the wind enters the upstream chamber through the upstream chamber's open sides. A second plurality of baffles are longitudinally mounted in the downstream chamber, and, in devices designed for low-wind conditions, operate to create in the downstream chamber, a downstream extraction vortex rotating in a direction opposite to the first direction when the wind enters the downstream chamber through the downstream chamber's open sides. In devices designed for high-wind conditions, the baffles in the downstream chamber operate to create an extraction vortex that rotates in the same direction as the drive vortex.

The floor of the upstream annular chamber slopes in a downstream direction as it approaches a central longitudinal axis of the device, thereby causing the drive vortex to flow downstream and pass through a central aperture located between the upstream annular chamber and the downstream annular chamber. The turbine is centrally mounted on a longitudinal drive shaft in the central aperture. The turbine is rotated by the drive vortex as the drive vortex passes through the turbine and combines with the extraction vortex, increasing its downstream velocity.

For low-wind conditions, the first plurality of baffles may be curved to form a toroidal pattern in the first direction, and the second plurality of baffles may be curved to form a toroidal pattern in the opposite direction. The baffles guide the ambient wind into two high velocity vortices (an upstream drive vortex and a downstream extraction vortex) which rotate in opposite directions. The device may also include an annular central divider between the upstream chamber and the downstream chamber that has a downstream surface that slopes away from the turbine as it approaches the central axis of the device. The surface of the central divider thereby causes the extraction vortex to flow downstream, creating an area of reduced air pressure on the downstream side of the turbine. This increases the flow of air from the upstream chamber through the turbine. High RPM and high torque are produced by the turbine due to three primary factors: (1) each blade of the turbine is shaped like a scoop which captures the rotational momentum of the drive vortex; (2) each blade of the turbine has a cross-sectional shape of an airfoil that generates lift in the direction of rotation of the turbine; and (3) the reversal of the direction of the vortex rotation adds additional force to the turbine in the direction of rotation.

A large flywheel may also be attached to the rotating turbine drive shaft. The flywheel may serve both as an internal energy storage device due to its angular momentum, and as a dynamo for a generator also mounted on the drive shaft.

In another aspect, the present invention is a water-powered energy conversion device for converting energy in a moving stream of water into mechanical or electrical energy. The device includes a rigid cylindrical frame having an upstream annular chamber and a downstream annular chamber, each of the chambers having sides that are open to allow entry of the stream of water. A first plurality of baffles are longitudinally mounted in the upstream chamber, and operate to create in the upstream chamber an upstream drive vortex rotating in a first direction when the stream of water enters the upstream chamber through the upstream chamber's open sides. A second plurality of baffles are longitudinally mounted in the downstream chamber, and operate to create in the downstream chamber a downstream extraction vortex also rotating in the first direction when the stream of water enters the downstream chamber through the downstream chamber's open sides. A floor of the upstream annular chamber slopes in a downstream direction as it approaches a central longitudinal axis of the device, thereby causing the drive vortex to pass through a central aperture located between the upstream annular chamber and the downstream annular chamber. A longitudinal shaft and a turbine are centrally mounted in the central aperture. The turbine is rotated by the drive vortex as the drive vortex passes through the turbine.

In yet another aspect, the present invention is a fluid-filled flywheel mounted on a drive shaft for reducing start-up inertia of the flywheel and maintaining angular momentum of the drive shaft as it rotates in a direction of rotation. The fluid-filled flywheel includes a hollow disk-shaped shell filled with fluid, and a plurality of radial bulkheads that separate the interior of the shell into separate sections. Each of the radial bulkheads includes at least one gate pivotally mounted thereon to open in a direction opposite to the direction of rotation. Each gate covers an aperture in the bulkhead when the gate is pivoted to a closed position, and each gate opens the aperture when the gate is pivoted to an open position. When the flywheel accelerates in the direction of rotation, the gates are opened by the fluid thus allowing the fluid to flow through the apertures in the bulkheads and reduce the start-up inertia of the flywheel. When the flywheel decelerates, the gates are closed by the fluid thus preventing the fluid from flowing through the apertures, and causing the flywheel to maintain angular momentum like a solid flywheel. The fluid-filled flywheel is particularly efficient when utilized with a wind-powered energy conversion device for which the input energy level varies.

BRIEF DESCRIPTION OF THE DRAWINGS

The invention will be better understood and its numerous objects and advantages will become more apparent to those skilled in the art by reference to the following drawings, in conjunction with the accompanying specification, in which.

In the drawings, like or similar elements are designated with identical reference numerals throughout the several views thereof, and the various elements depicted are not necessarily drawn to scale.

DETAILED DESCRIPTION OF EMBODIMENTS

Figure 1:
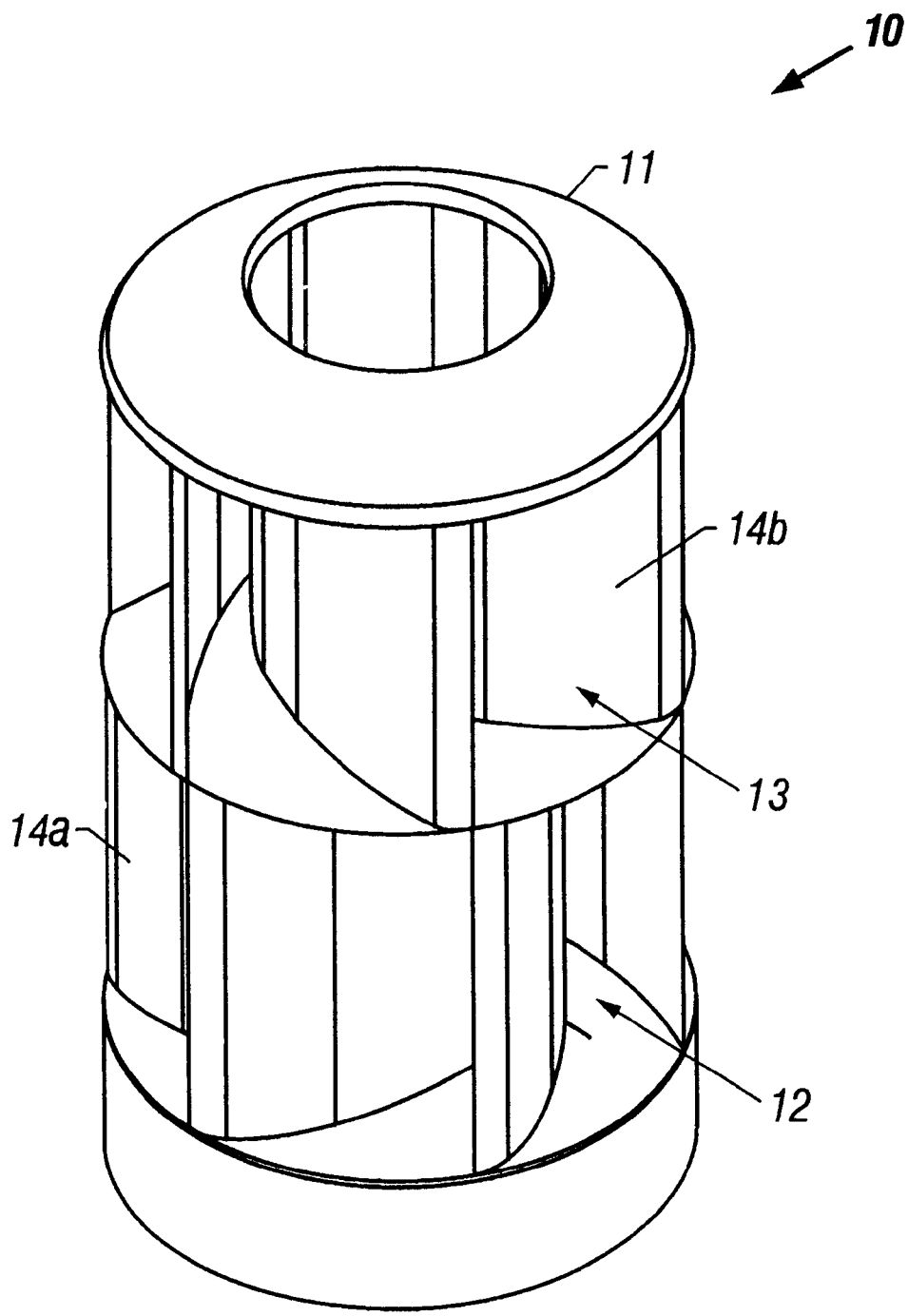
FIG. 1 is a perspective view of an embodiment of the present invention that converts wind energy to mechanical or electrical energy.

FIG. 1 is a perspective view of an embodiment of the present invention that converts wind energy to mechanical or electrical energy. The energy conversion device 10 includes a stationary cowling 11 surrounding an upstream annular chamber 12 and a downstream annular chamber 13. The cowling may be constructed of any suitable rigid material such as wood, plastic, metal, and so on. Furthermore, the cowling may be fabricated from a transparent material, making the device visually unobtrusive. In the preferred embodiment of the present invention, the cowling is cylindrical and is constructed of a high-grade, ultraviolet-protected plastic.

The cowling 11 includes a plurality of longitudinal baffles that are curved and arranged in a toroidal pattern. Upstream baffles 14a are mounted in the upstream annular chamber 12, and downstream baffles 14b are mounted in the downstream annular chamber 13. In the preferred embodiment of the present invention, approximately six toroidal longitudinal baffles are mounted in each chamber. The baffles function to guide ambient wind into each chamber. The narrowing cross-sectional area between the baffles causes the air to accelerate as it moves toward the center of the device, creating two high-velocity vortices (an upstream drive vortex and a downstream extraction vortex). Although the invention is described herein primarily as a vertically oriented cylinder, it should be understood that the device may be installed in other orientations, such as a horizontal orientation, that result in the device having an upstream annular chamber and a downstream annular chamber that are at the same height. Alternatively, as noted below in connection with FIG. 7, the device may be inverted when used in water since water vortices more readily move downward rather than upward.

In the embodiment illustrated in FIG. 1, in which low-speed wind is the input energy source, the upstream baffles 14a and the downstream baffles 14b are curved in opposite directions. The baffles therefore create two high-velocity vortices which rotate in opposite directions. As described below in connection with FIG. 4, the direction of the vortex flow is reversed in a turbine located between the upstream annular chamber 12 and the downstream annular chamber 13, thereby adding additional rotational power to the turbine. In the hydro-electrical embodiment in which flowing water is the input energy source, and in high-speed wind conditions such as when the device is mounted on a vehicle, the upstream baffles and the downstream baffles may be curved in the same direction. In these embodiments, therefore, the baffles create two high-velocity vortices which rotate in the same direction. The device may be converted from a low-wind device to a high-wind device by removing the counter-rotational downstream annular chamber 13 and replacing it with a downstream annular chamber that creates a vortex rotating in the same direction as the drive vortex.

In the preferred embodiment of the present invention, plastic mesh (not shown) may surround the entry and exit openings of the cowling 11 to prevent birds, animals, or debris from entering the device 10. In addition, should the device fail structurally, any broken parts are contained by the mesh instead of flying out into the vicinity and causing damage or injury.

Figure 2:
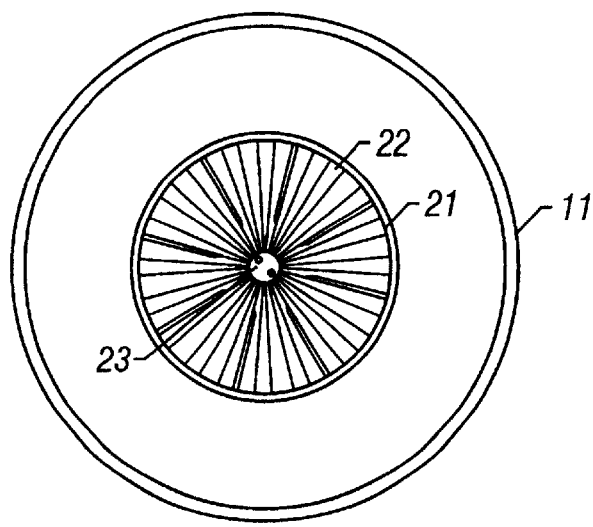
FIG. 2 is a top plan view of the embodiment of FIG. 1.

FIG. 2 is a top plan view of the embodiment of FIG. 1. The top of the cowling 11 includes a central aperture 21 through which the air in the extraction vortex exits the device. In the preferred embodiment, the extraction vortex exits the device rotating in a counter-cyclonic direction (clockwise in the Northern Hemisphere) so that it dissipates rather than creating potentially damaging whirlwinds. The turbine 22 is visible through the aperture. The turbine rotates around a central drive shaft 23.

Figure 3:
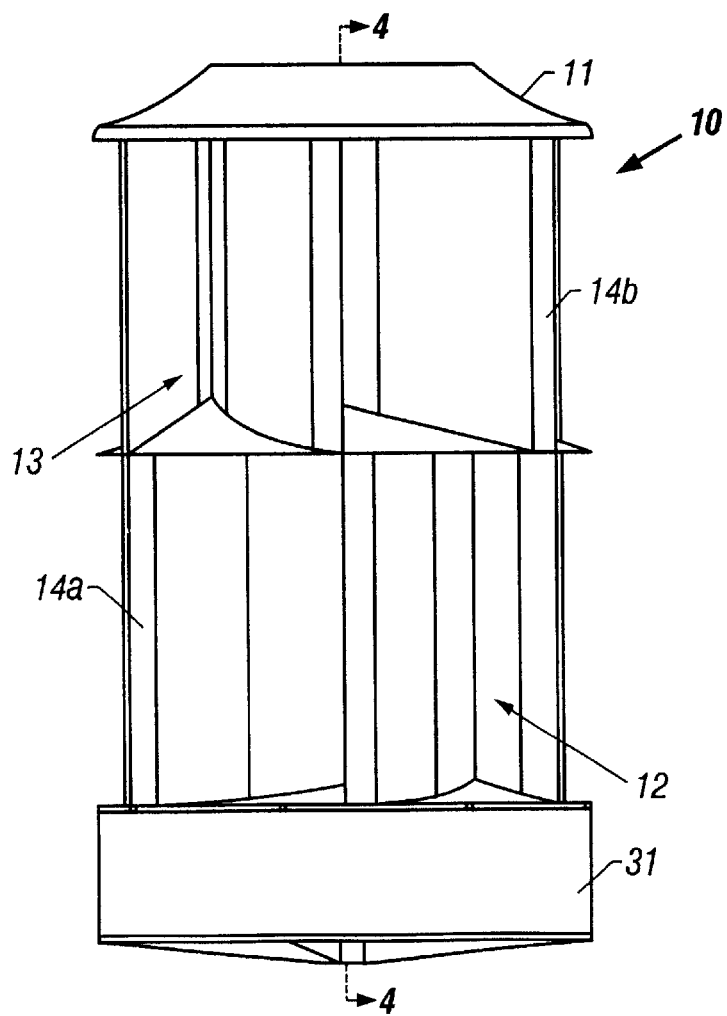
FIG. 3 is a side elevational view of the embodiment of FIG. 1.

FIG. 3 is a side elevational view of the embodiment of FIG. 1 illustrating an exemplary elevational profile of the cowling 11, the upstream annular chamber 12, the downstream annular chamber 13, and the baffles 14a and 14b. The cowling may mount upon a base 31. The base may be utilized to enclose additional mechanical assemblies such as a flywheel and/or an electrical generator.

Figure 4:
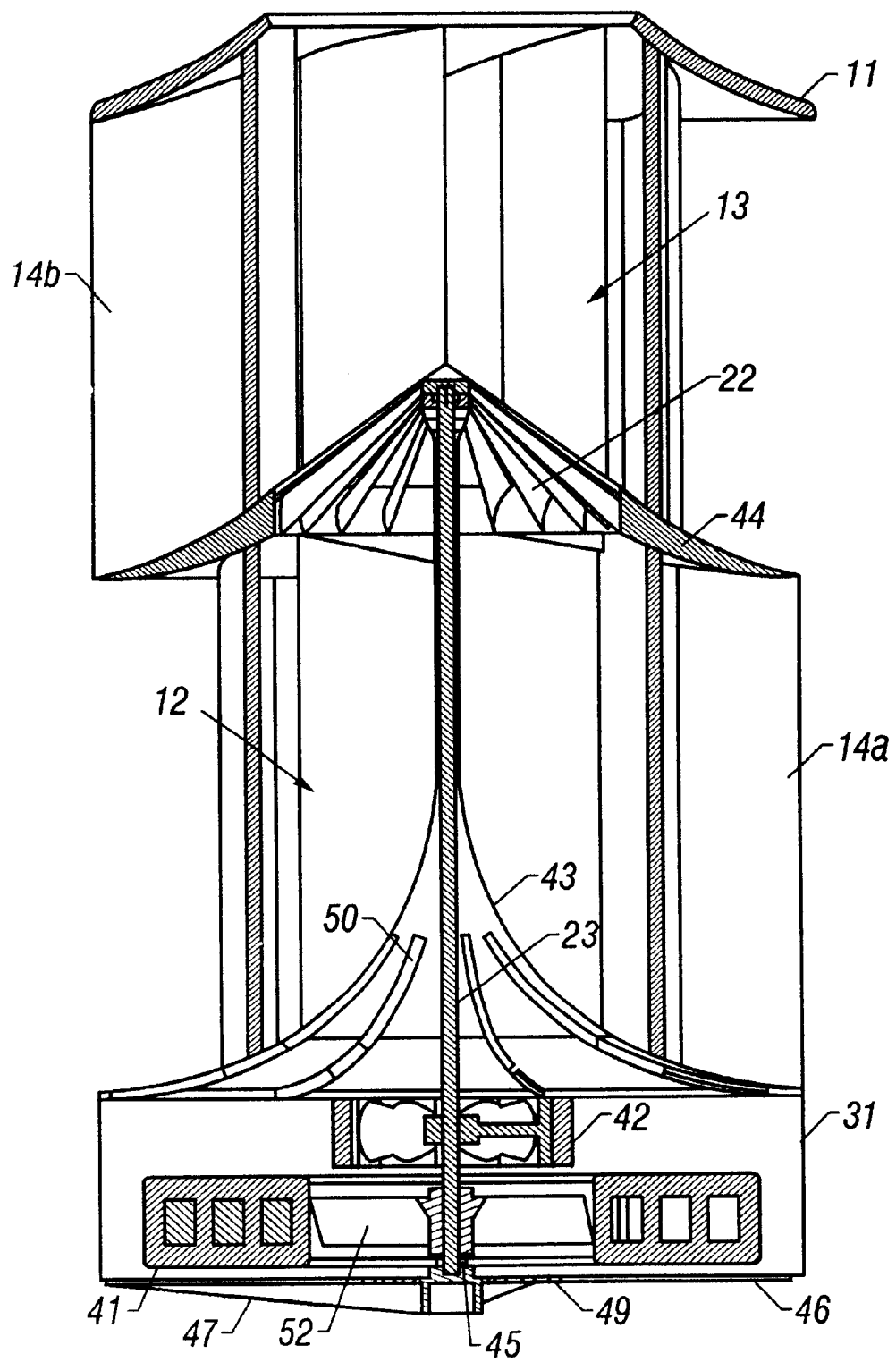
FIG. 4 is a cross-sectional view of the embodiment of FIG. 1 taken along line 4—4 of FIG. 3 with an electrical generator installed to produce electrical energy.

FIG. 4 is a cross-sectional view of the embodiment of FIG. 1 taken along line 4—4 of FIG. 3 with a flywheel 41 installed in the base 31 along with an electrical generator 42 to produce electrical energy. Ambient wind flows simultaneously into the upstream annular chamber 12 through upstream baffles 14a, and into the downstream annular chamber 13 through the downstream baffles 14b through the sides of the cowling 11. The baffles guide the ambient wind towards the center of the device 10. A sloping parabolic floor (deck) 43 of the upstream annular chamber 12 causes the wind to flow downstream into the centrally mounted turbine 22 that rotates on the central drive shaft 23. The device 10 produces power by guiding ambient wind flows into two high-velocity vortices arranged upstream and downstream of the turbine which converts the wind flows to mechanical energy by turning the drive shaft 23. High RPM and high torque are produced by the turbine due to three primary factors: (1) each blade of the turbine is shaped like a scoop which captures the rotational momentum of the drive vortex; (2) each blade of the turbine has a cross-sectional shape of an airfoil that generates lift in the direction of rotation of the turbine; and (3) in low wind conditions, the reversal of the direction of the vortex rotation adds additional force to the turbine in the direction of rotation.

The large flywheel 41 may be attached to the rotating turbine drive shaft 23. In one embodiment, the flywheel may be a permanent magnet, surrounded by copper windings. The flywheel may serve both as an internal energy storage device due to its angular momentum, and as a dynamo for the generator 42 mounted under the deck 43 of the upstream annular chamber 12. A solid-state electronic regulator (not shown) may be utilized to control the electrical current load. The regulator maintains a zero load until a preset rotational velocity (RPM) is reached. The load is then increased in order to generate electricity while maintaining the RPM of the turbine at a preselected level.

Figure 5:
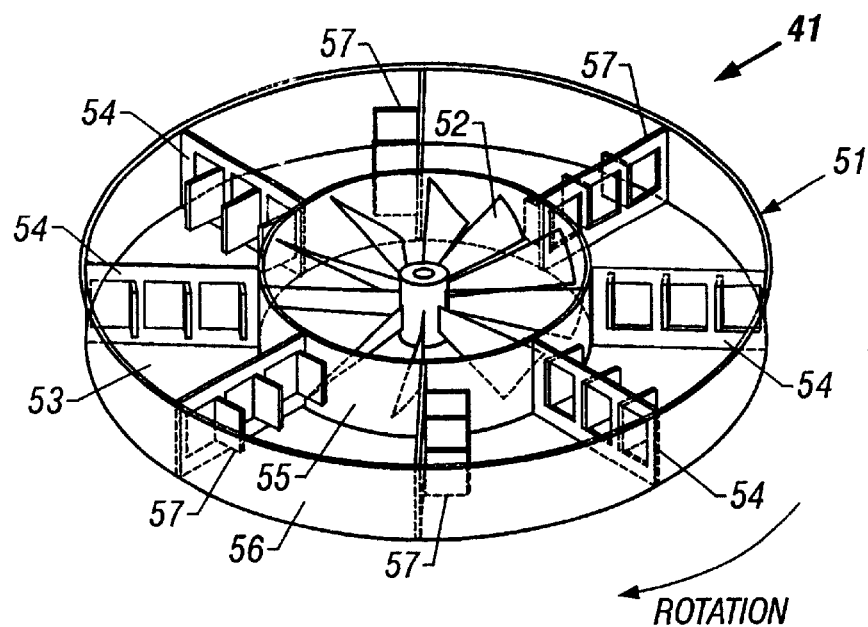
FIG. 5 is a perspective view of a fluid-filled flywheel suitable for use with the present invention.
Figure 7:
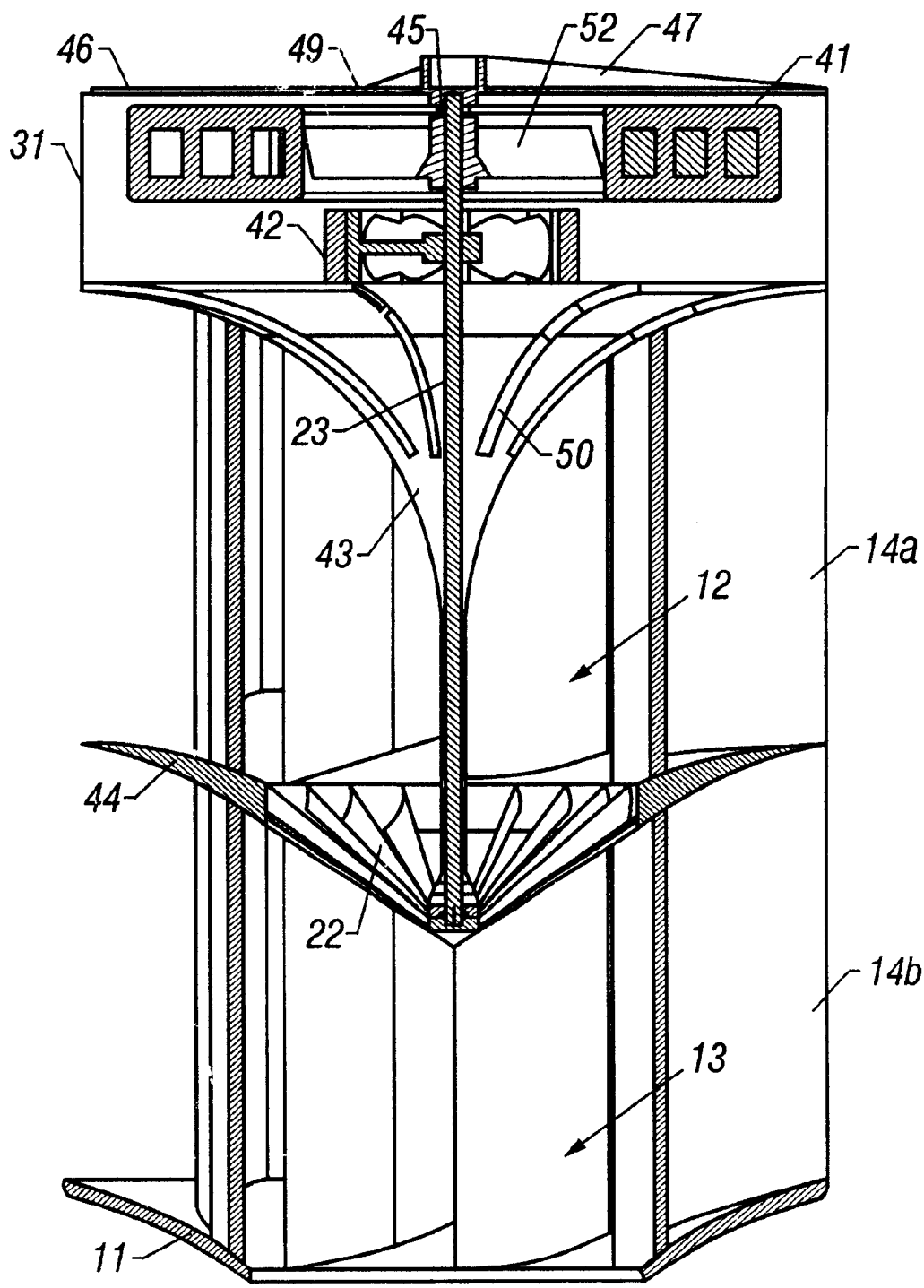
FIG. 7 is a cross-sectional view of an embodiment of the present invention that converts the energy of flowing water to electrical energy.

Referring briefly to FIG. 5, there is shown a perspective view of another embodiment of the flywheel 41. In this embodiment, the flywheel (shown in phantom) includes a hollow disk-shaped shell 51 that is filled with a fluid such as water. The design shown also includes a cooling fan 52 in the hub of the flywheel that rotates with the drive shaft 23 and the flywheel to produce a flow of cooling air that is used to cool the adjacent generator 42 (FIGS. 4 and 7). The placement of the fan in the hub of the flywheel creates an annular chamber 53 that holds the fluid. Within the chamber, there are a plurality of radial bulkheads 54 extending from the interior wall 55 to the exterior wall 56 of the chamber. Each of the radial bulkheads includes hinged gates or hatches 57. In the exemplary embodiment illustrated, each radial bulkhead includes three hinged gates.

During acceleration of the flywheel 41, the gates 57 open in the opposite direction of rotation. This allows the fluid to flow through the radial bulkheads 54, reducing start-up inertia. The fluid then slowly comes up to speed due to friction with the interior and exterior walls 55 and 56 of the annular chamber, and due to the motion of the radial bulkheads through the fluid. During deceleration of the flywheel, the gates close because of the forward momentum of the fluid. This creates solid radial bulkheads and causes the flywheel to perform as a solid flywheel. The angular momentum of the flywheel then helps to maintain the angular velocity of the drive shaft 23 when the input power of the wind drops off.

Figure 6:
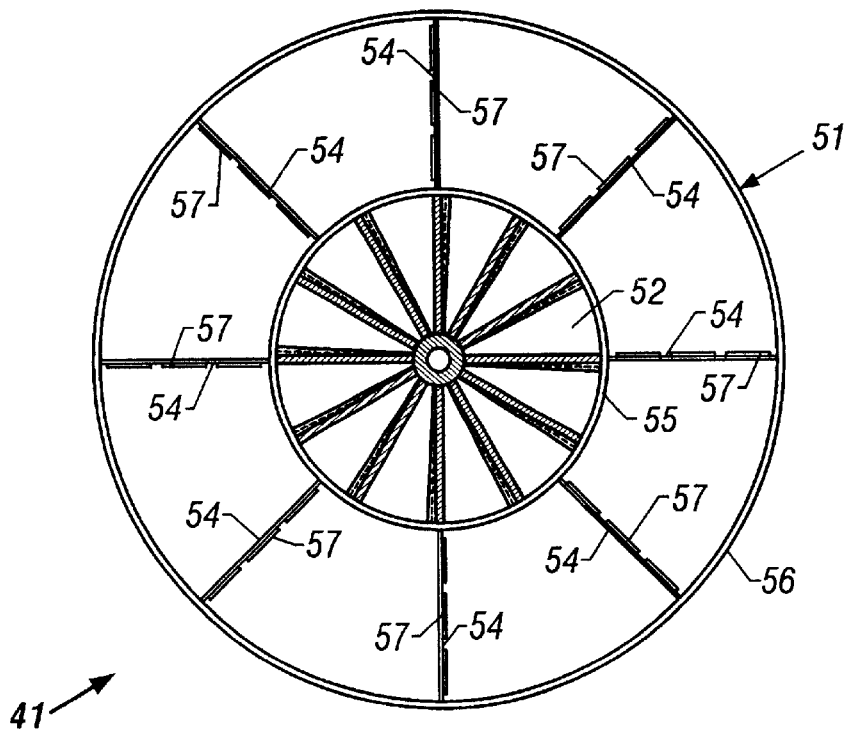
FIG. 6 is a top plan view of the fluid-filled fly wheel of FIG. 5.

FIG. 6 is a top plan view of the fluid-filled flywheel 41 of FIG. 5, showing the blades of the cooling fan 52 in the hub of the flywheel, the annular chamber 53, the radial bulkheads 54, and the gates 57 in the closed (decelerating) position.

Thus, the fluid-filled flywheel 41 is particularly well suited for use with the energy conversion device 10 of the present invention. The fluid-filled flywheel allows rapid spin-up of the drive shaft 23 by reducing the start-up inertia, but resists deceleration like a solid flywheel. These features can significantly boost the efficiency of a wind-powered or water-powered device that operates with varying input power levels. By simply inverting the flywheel, the fluid-filled flywheel can be used with systems that spin either clockwise or counter-clockwise. As an additional feature, shipping weight is greatly reduced because the fluid can be added at the point of use.

Referring again to FIG. 4, an annular central divider (mid-deck) 44 divides the upstream annular chamber 12 from the downstream annular chamber 13. The top of the mid-deck slopes away from the turbine, causing the ambient wind entering the downstream annular chamber to flow downstream, away from the turbine. This creates an area of reduced air pressure on the downstream side of the turbine 22 that increases the flow of air from the upstream annular chamber 12 through the turbine. Each blade of the turbine 22 is a curved airfoil which receives rotational impetus from the rotation of the drive vortex, the reversal of the vortex direction, and aerodynamic lift that is generated by the airfoil in the direction of rotation of the turbine.

In the preferred embodiment of the present invention, the turbine 22 and flywheel 41 may be made of metal. Further, all metal parts may be coated with, for example, plastic, chrome, or paint to prevent corrosion. As discussed above, the flywheel may be a permanent magnet or may be a fluid-filled flywheel. All bearings such as bearing 45 may be magnetic-repulsion-levitation bearings so that there is no physical contact between the moving and stationary elements of the device. The base 31 may mount upon a support plate 46 and/or a support brace 47, depending on the structure on which the device is mounted and the orientation of the device.

The central drive shaft 23 may also drive the cooling fan 52 that draws cooling air through vents 49 in the support plate and directs the air through the generator 42. The heated air may exit through louvers 50 in the parabolic deck 43 of the upstream annular chamber 12 where it then mixes with the driving airflow in the upstream annular chamber to defrost the interior of the device and the turbine 22.

The device 10 may vary in its dimensions, depending upon the specific application for which it is utilized. For example, the dimensions of a wind-powered device that is mounted on the roof of a house may be between 40 inches and 48 inches in diameter, and between 60 inches and 78 inches in height. In this configuration, the turbine 22 has a diameter approximately one-half the diameter of the exterior of the cowling 11 (i.e., approximately 20–24 inches in diameter). Larger versions may be utilized for larger buildings such as factories or office buildings with increased economies of scale. For example, an office building may use a device that is 20 feet in diameter and 20 feet tall with a turbine that is 10 feet in diameter. A vehicle-mounted device (for example, for a passenger car), designed for high-wind conditions, may be about 24 inches in diameter and 6 inches in height. The generator and flywheel, if any, may be mounted inside the contour of the vehicle, or on a luggage rack. A small hydro-electric version of the device that is placed in a running stream or river may have similar dimensions to the vehicle-mounted device. In addition, since the outflow of the hydro-electric version is directed downward, a deflector may be utilized in shallow bodies of water to prevent erosion of the stream bed.

It should be noted that when the present invention is oriented vertically, the turbine 22, the generator 42, and the flywheel 41 rotate around a vertical axis. Therefore, the supporting structures are not subject to the vibration and stress produced by gravity effects in prior art devices in which propellers rotate around a horizontal axis. Moreover, exceptional wind-conversion efficiency is realized from the present invention as it diverts and accelerates the ambient wind flow into vortices that have several times the velocity of the ambient wind flow when they reach the turbine. Additionally, the acceleration of the air flow into the upstream and downstream annular chambers creates a low pressure area that pulls air into the device from an effective cross-sectional area that is greater than the physical cross-sectional area of the device. As a result, the present invention provides a new and improved wind-power conversion device which is quieter, safer, more efficient, and more cost effective than existing devices.

Referring now to FIG. 7, there is shown a cross-sectional view of an embodiment of the present invention that converts the energy of flowing water to electrical energy (i.e, a hydro-electrical device). There are three key differences between the hydro-electrical embodiment from the low-wind-powered embodiment of FIGS. 1–4. First, the upstream baffles 14a and the downstream baffles 14b curve in the same direction. The baffles therefore create two high-velocity vortices which rotate in the same direction. This is a more efficient design when the fluid flowing through the device is an incompressible fluid such as water. Second, the device operates more efficiently when it is inverted and mounted vertically since water vortices move downward due to the force of gravity. The third difference is the ratio of the height of the device to the diameter of the device. As noted above, the hydro-electric embodiment of the device may have a height that is shorter when compared to its diameter, and may have a height that is equal to or less than its diameter.

It is to be understood that even though numerous characteristics and advantages of the present invention have been set forth in the foregoing description, the disclosure is illustrative only, and changes may be made in detail, especially in matters of size, shape, and arrangement of parts within the principles of the invention to the full extent indicated by the broad general meaning of the terms in which the appended claims are expressed.

What is claimed is:

1. A fluid-powered energy conversion device for converting energy in a moving fluid into mechanical energy, said device comprising:
   a rigid cylindrical frame having an upstream annular chamber and a downstream annular chamber, each of said chambers having sides that are open to allow entry of the moving fluid;
   a first plurality of baffles longitudinally mounted in the upstream chamber that operate to create in the upstream chamber, an upstream drive vortex rotating in a first direction when the moving fluid enters the upstream chamber through the upstream chamber's open sides;
   a second plurality of baffles longitudinally mounted in the downstream chamber that operate to create in the downstream chamber, a downstream extraction vortex rotating in a direction opposite to the first direction when the moving fluid enters the downstream chamber through the downstream chamber's open sides;
   a floor of the upstream annular chamber that slopes toward the downstream chamber as the floor approaches a central longitudinal axis of the device, said floor causing the drive vortex to flow downstream and pass through a central aperture located between the upstream annular chamber and the downstream annular chamber;
   a longitudinal drive shaft centrally mounted in the central aperture; and
   a turbine mounted on the drive shaft in the central aperture, said turbine being rotated by the drive vortex as the drive vortex passes through the turbine and reverses direction to match the direction of the extraction vortex.

2. The fluid-powered energy conversion device of claim 1 wherein said first plurality of baffles are curved to form a toroidal pattern in the first direction, and said second plurality of baffles are curved to form a toroidal pattern in the direction opposite to the first direction.

3. The fluid-powered energy conversion device of claim 2 wherein said turbine comprises a plurality of rotating blades, each of said blades having a cross-sectional shape of a curved airfoil that generates a lift force, said lift force being directed in the direction of rotation of the turbine.

4. The fluid-powered energy conversion device of claim 1 further comprising a flywheel mounted on the drive shaft, said flywheel having sufficient mass to operate as an internal energy storage device due to its angular momentum.

5. The fluid-powered energy conversion device of claim 4 wherein said flywheel is a permanent magnet.

6. The fluid-powered energy conversion device of claim 4 wherein said flywheel is a fluid-filled flywheel that rotates with the drive shaft in a direction of rotation, said fluid-filled flywheel comprising:
- a hollow disk-shaped shell filled with fluid; and
- a plurality of radial bulkheads that separate the interior of the shell into separate sections, each of said bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;
- whereby the gates are opened by the fluid when the flywheel accelerates in the direction of rotation, thus allowing the fluid to flow through the apertures in the bulkheads and reduce start-up inertia of the flywheel, and whereby the gates are closed by the fluid when the flywheel decelerates, thus preventing the fluid from flowing through the apertures, and causing the flywheel to maintain angular momentum like a solid flywheel.

7. The fluid-powered energy conversion device of claim 6 wherein the hollow disk-shaped shell includes:
- an annular compartment filled with the fluid; and
- a cooling fan mounted in a central hub section of the shell.

8. The fluid-powered energy conversion device of claim 1 further comprising an annular central divider between the upstream chamber and the downstream chamber, said divider having a downstream surface that slopes downstream as it approaches the central longitudinal axis of the device, said downstream surface causing the extraction vortex to flow downstream, thereby creating an area of reduced fluid pressure downstream of the turbine.

9. The fluid-powered energy conversion device of claim 1 further comprising an electrical generator mounted on the drive shaft, said generator converting mechanical energy from the rotation of the shaft into electrical energy.

10. The fluid-powered energy conversion device of claim 9 further comprising a cooling fan mounted on the drive shaft, said cooling fan directing cooling air through the generator.

11. A wind-powered energy conversion device for converting wind energy into mechanical energy, said device comprising:
- a rigid cylindrical frame having an upstream annular chamber, a downstream annular chamber, and an annular central divider between the upstream chamber and the downstream chamber, each of said chambers having sides that are open to allow entry of ambient wind, and said annular central divider having a central aperture therein;
- a first plurality of baffles longitudinally mounted in the upstream chamber and curved to form a toroidal pattern that operates to create in the upstream chamber, an upstream drive vortex rotating in a first direction when the ambient wind enters the upstream chamber through the upstream chamber's open sides;
- a second plurality of baffles longitudinally mounted in the downstream chamber and curved to form a toroidal pattern operable to create in the downstream chamber, a downstream extraction vortex rotating in a direction opposite to the first direction when the ambient wind enters the downstream chamber through the downstream chamber's open sides;
- a floor of the upstream annular chamber that slopes downstream as the floor approaches a central longitudinal axis of the device, said floor causing the drive vortex to flow downstream and pass through the central aperture in the annular central divider;
- a longitudinal drive shaft centrally mounted in the central aperture; and
- a turbine mounted on the drive shaft in the central aperture, said turbine comprising a plurality of rotating blades, each of said blades having a cross-sectional shape of a curved airfoil that generates a lift force, said lift force being directed in the direction of rotation of the turbine, said turbine being rotated by the drive vortex as the drive vortex passes through the turbine and reverses direction to match the direction of the extraction vortex.

12. The wind-powered energy conversion device of claim 11 further comprising a flywheel mounted on the drive shaft, said flywheel having sufficient mass to operate as an internal energy storage device due to its angular momentum.

13. The wind-powered energy conversion device of claim 11 wherein the annular central divider includes a downstream surface that slopes downstream as the surface approaches the central longitudinal axis of the device, said downstream surface causing the extraction vortex to flow downstream, thereby creating an area of reduced air pressure downstream of the turbine.

14. The wind-powered energy conversion device of claim 11 further comprising an electrical generator mounted on the drive shaft, said generator converting mechanical energy from the rotation of the shaft into electrical energy.

15. The wind-powered energy conversion device of claim 11 wherein the extraction vortex rotates in a counter-cyclonic direction so that the extraction vortex dissipates after it exits the downstream chamber.

16. A wind-powered energy conversion device for converting wind energy into mechanical energy, said device comprising:
- a rigid cylindrical frame having an upstream annular chamber and a downstream annular chamber, each of said chambers having sides that are open to allow entry of ambient wind;
- a first plurality of baffles longitudinally mounted in the upstream chamber that create in the upstream chamber, an upstream drive vortex rotating in a first direction when the ambient wind enters the upstream chamber through the upstream chamber's open sides;
- a second plurality of baffles longitudinally mounted in the downstream chamber that create in the downstream chamber, a downstream extraction vortex rotating in the first direction when the ambient wind enters the downstream chamber through the downstream chamber's open sides;
- a floor of the upstream annular chamber that slopes downstream as the floor approaches a central longitudinal axis of the device, said floor causing the drive vortex to flow downstream and pass through a central aperture located between the upstream annular chamber and the downstream annular chamber;
- a longitudinal drive shaft centrally mounted in the central aperture;
- a turbine mounted on the drive shaft in the central aperture, said turbine being rotated by the drive vortex as the drive vortex passes through the turbine; and a fluid-filled flywheel mounted on the drive shaft that rotates with the drive shaft in a direction of rotation, said fluid-filled flywheel comprising:
  a hollow disk-shaped shell filled with fluid; and
  a plurality of radial bulkheads that separate the interior of the shell into separate sections, each of said bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;
  whereby the gates are opened by the fluid when the flywheel accelerates in the direction of rotation, thus allowing the fluid to flow through the apertures in the bulkheads and reduce start-up inertia of the flywheel, and whereby the gates are closed by the fluid when the flywheel decelerates, thus preventing the fluid from flowing through the apertures, and causing the flywheel to maintain angular momentum like a solid flywheel.

17. A water-powered energy conversion device for converting energy in a moving stream of water into mechanical energy, said device comprising:
  a rigid cylindrical flame having an upstream annular chamber and a downstream annular chamber, each of said chambers having sides that are open to allow entry of the stream of water;
  a first plurality of baffles longitudinally mounted in the upstream chamber that create in the upstream chamber, an upstream drive vortex rotating in a first direction when the stream of water enters the upstream chamber through the upstream chamber's open sides;
  a second plurality of baffles longitudinally mounted in the downstream chamber that create in the downstream chamber, a downstream extraction vortex rotating in the first direction when the stream of water enters the downstream chamber through the downstream chamber's open sides;
  a floor of the upstream annular chamber that slopes downstream as the floor approaches a central longitudinal axis of the device, said floor causing the drive vortex to flow downstream and pass through a central aperture located between the upstream annular chamber and the downstream annular chamber;
  a longitudinal drive shaft centrally mounted in the central aperture;
  a turbine mounted on the drive shaft in the central aperture, said turbine being rotated by the drive vortex as the drive vortex passes through the turbine; and
  a fluid-filled flywheel mounted on the drive shaft that rotates with the drive shaft in a direction of rotation, said fluid-filled flywheel comprising:
    a hollow disk-shaped shell filled with fluid; and
    a plurality of radial bulkheads that separate the interior of the shell into separate sections, each of said bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;
    whereby the gates are opened by the fluid when the flywheel accelerates in the direction of rotation, thus allowing the fluid to flow through the apertures in the bulkheads and reduce start-up inertia of the flywheel, and whereby the gates are closed by the fluid when the flywheel decelerates, thus preventing the fluid from flowing through the apertures, and causing the flywheel to maintain angular momentum like a solid flywheel.

18. A fluid-filled flywheel mounted on a drive shaft for reducing start-up inertia of the flywheel and maintaining angular momentum of the drive shaft as the shaft rotates in a direction of rotation, said fluid-filled flywheel comprising:
  a hollow disk-shaped shell filled with fluid; and
  a plurality of radial bulkheads that separate the interior of the shell into separate sections, each of said bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;
  whereby the gates are opened by the fluid when the flywheel accelerates in the direction of rotation, thus allowing the fluid to flow through the apertures in the bulkheads and reduce the start-up inertia of the flywheel, and whereby the gates are closed by the fluid when the flywheel decelerates, thus preventing the fluid from flowing through the apertures, and causing the flywheel to maintain angular momentum like a solid flywheel.

19. The fluid-filled flywheel of claim 18 wherein the hollow disk-shaped shell includes:
  an annular compartment filled with the fluid; and
  a cooling fan mounted in a central hub section of the shell.

20. A combination wind-powered energy conversion device and fluid-filled flywheel, said energy conversion device receiving intermittent input energy from ambient wind and converting the input energy into mechanical energy, and said fluid-filled flywheel reducing start-up inertia of the flywheel and maintaining angular momentum of a drive shaft whenever the input energy decreases, said combination comprising:
  a rigid cylindrical frame having an upstream annular chamber and a downstream annular chamber, each of said chambers having sides that are open to allow entry of the moving fluid;
  a first plurality of baffles longitudinally mounted in the upstream chamber that operate to create in the upstream chamber, an upstream drive vortex rotating in a first direction when the moving fluid enters the upstream chamber through the upstream chamber's open sides;
  a second plurality of baffles longitudinally mounted in the downstream chamber operable to create in the downstream chamber, a downstream extraction vortex rotating in a direction opposite to the first direction when the moving fluid enters the downstream chamber through the downstream chamber's open sides;
  a floor of the upstream annular chamber that slopes toward the downstream chamber as the floor approaches a central longitudinal axis of the device, said floor causing the drive vortex to flow downstream and pass through a central aperture located between the upstream annular chamber and the downstream annular chamber;
  a longitudinal drive shaft centrally mounted in the central aperture;
  a turbine mounted on the drive shaft in the central aperture, said turbine being rotated by the drive vortex as the drive vortex passes through the turbine and reverses direction to match the direction of the extraction vortex; and a fluid-filled flywheel mounted on the drive shaft, said flywheel comprising:
 a hollow disk-shaped shell filled with fluid; and
 a plurality of radial bulkheads that separate the interior of the shell into separate sections, each of said bulkheads having at least one gate pivotally mounted thereon to open in a direction opposite to the direction of rotation, said gate covering an aperture in the bulkhead when the gate is pivoted to a closed position, and said gate opening the aperture when the gate is pivoted to an open position;

whereby the gates are opened by the fluid when the input energy increases, causing the flywheel to accelerate in the direction of rotation, thus allowing the fluid to flow through the apertures in the bulkheads and reduce start-up inertia of the flywheel, and whereby the gates are closed by the fluid when the input energy decreases, causing the flywheel to decelerate, thus preventing the fluid from flowing through the apertures, and causing the flywheel to maintain the angular momentum of the drive shaft like a solid flywheel.

* * * * *